United States Patent
Danilov et al.

(10) Patent No.: US 11,157,482 B2
(45) Date of Patent: Oct. 26, 2021

(54) DATA DISTRIBUTION WITHIN A FAILURE DOMAIN TREE

(71) Applicant: Seagate Technology LLC, Cupertino, CA (US)

(72) Inventors: Nikita Danilov, Moscow (RU); Nachiket Shrikant Sahasrabudhe, Pune (IN)

(73) Assignee: Seagate Technology LLC, Fremont, CA (US)

( * ) Notice: Subject to any disclaimer, the term of this patent is extended or adjusted under 35 U.S.C. 154(b) by 154 days.

(21) Appl. No.: 16/545,405

(22) Filed: Aug. 20, 2019

(65) Prior Publication Data

US 2020/0250173 A1    Aug. 6, 2020

(30) Foreign Application Priority Data

Feb. 5, 2019    (RU) .......................... RU20195103210

(51) Int. Cl.
     *G06F 16/23*      (2019.01)
     *G06F 16/22*      (2019.01)
     *G06F 11/10*      (2006.01)
     *G06F 11/07*      (2006.01)

(52) U.S. Cl.
     CPC ...... *G06F 16/2365* (2019.01); *G06F 16/2246* (2019.01)

(58) Field of Classification Search
     CPC ............. G06F 16/2365; G06F 16/2246; G06F 11/1076; G06F 11/079; G06F 11/1032; G06F 3/067; G06F 11/202; G06F 11/0793
     See application file for complete search history.

(56) References Cited

U.S. PATENT DOCUMENTS

| | | | |
|---|---|---|---|
| 2015/0188978 A1* | 7/2015 | Petculescu | H04L 67/02 709/217 |
| 2015/0355971 A1 | 12/2015 | Becker-Szendy et al. | |
| 2016/0349993 A1* | 12/2016 | Udupi | G06F 3/0689 |
| 2017/0147458 A1* | 5/2017 | Epstein | G06F 3/0683 |
| 2017/0255530 A1 | 9/2017 | Barzik et al. | |
| 2018/0285002 A1 | 10/2018 | Hayasaka et al. | |
| 2019/0050301 A1* | 2/2019 | Juniwal | G06F 3/0649 |
| 2019/0235775 A1* | 8/2019 | Zwiegincew | G06F 3/0604 |

(Continued)

FOREIGN PATENT DOCUMENTS

WO      2017/068438      4/2017

OTHER PUBLICATIONS

European Search Report from EP Application No. 20155662.8 dated Jun. 25, 2020, 13 pages.

(Continued)

*Primary Examiner* — Robert W Beausoliel, Jr.
*Assistant Examiner* — Mohammad Solaiman Bhuyan
(74) *Attorney, Agent, or Firm* — Mueting Raasch Group

(57) ABSTRACT

Systems, apparatus, and methods for data distribution within a failure domain tree are described herein. Data objects may be distributed uniformly into symmetric failure domain trees. Asymmetric failure domain trees may be used to generate symmetric failure domain trees. The systems, apparatus, and methods may distribute a data object to attempt to satisfy the failure tolerance level of as many failure domain levels of the symmetric failure domain trees as possible.

19 Claims, 9 Drawing Sheets

(56) References Cited

U.S. PATENT DOCUMENTS

2020/0226146 A1\* 7/2020 Goyal .................... G06F 16/27

OTHER PUBLICATIONS

Holland, et al., "Parity Declustering for Continuous Operation in Redundant Disk Arrays", 1992, *Proceedings of the 5th Conference on Architectural Support for Programming Languages and Operating Systems,* APLOS V, Oct. 12-15, 1992, Boston Massachusetts, 13 pages. Available online at <www.pdl.cmu.edu/ftp/Declustering/ASPLOS.pdf>. Retrieved from the Internet Aug. 20, 2019.

Muntz, et al., "Performance Analysis of Disks Arrays Under Failure", *Proceedings of the 16th VLDB Conference,* McLeod et al., editors. 16th International Conference on Very Large Data Bases, Aug. 13-16, 1990, Brisbane Australia, pp. 162-173. Available online at <https://pdfs.semanticscholar.org/5d79/6dce6ad1ab03522026f08b78a864470c51de.pdf>. Retrieved from the Internet Aug. 20, 2019.

Poitras, *The Nutanix Bible,* 2019, 367 pages (if printed to PDF format). Available online at <http://nutanixbible.com/#anchor-erasure-coding-71>. Online reference, updated periodically. Title page, Table of Contents and Foreword retrieved from the Internet on Aug. 20, 2019. 14 pages.

\* cited by examiner

DATA DISTRIBUTION WITHIN A FAILURE DOMAIN TREE

This application claims the benefit of priority under 35 U.S.C. § 119(a) of RU Application Ser. No. 2019103210 filed Feb. 5, 2019, the disclosure of which is incorporated by reference herein in its entirety.

The disclosure herein relates to data distribution within a failure domain tree, and further to systems, apparatus, and methods for performing and implementing such data distribution within a failure domain tree.

SUMMARY

One illustrative system may include a symmetric failure domain tree comprising a plurality of failure domain levels (FDL) extending from a top FDL to a bottom FD. Each FDL may comprise at least one node, and the top FDL may comprise a single root node. Each other FDL may comprise at least one node operably coupled to a node in the FDL thereabove, and each node of the bottom FDL may be a storage node to store data. The illustrative system may further include a controller comprising one or more processors and configured to receive a data object comprising data blocks and uniformly distribute the data blocks of the data object across the symmetric failure domain tree.

One illustrative apparatus may include data storage hardware defining an asymmetric failure domain tree comprising a plurality of FDLs extending from a top FDL to a bottom FDL. Each FDL may comprise at least one node, and the top FDL may comprise a single root node. Each other FDL may comprise at least one node operably coupled to a node in the FDL thereabove, and each node of the bottom FDL may be a storage node to store data. At least one node of the asymmetric failure domain tree may be operably coupled to a different number of nodes in the FDL thereunder as any other nodes of the same FDL. The apparatus may further include a controller comprising one or more processors and operably coupled to the data storage hardware. The controller may be configured to generate a symmetric failure domain tree using the asymmetric failure domain tree, and each node of each FDL of the symmetric failure domain tree may be operably coupled to the same number of nodes in the FDL thereunder as any other nodes of the same FDL.

An illustrative method may include receiving a data object comprising data blocks to be stored in a failure domain tree and defining a failure recovery value. The failure recovery value may be a maximum number of failed data blocks while being able to recover the data object. The failure domain tree may comprise a plurality of failure domain levels (FDL) extending from a top FDL to a bottom FDL, and each FDL may comprise at least one node and may define a failure tolerance value. The failure tolerance value (FTV) may be a number of nodes permitted to fail in the FDL. The top FDL may comprise a single root node, and each other FDL may comprise at least one node operably coupled to a node in the FDL thereabove. Each node of the bottom FDL may be a storage node to store data. The illustrative method may further include determining whether a given FDL of the FDLs would result in data object unavailability if the data object were stored within the failure domain tree and more than an FTV number of nodes of the given FDL fail.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Figure 1:
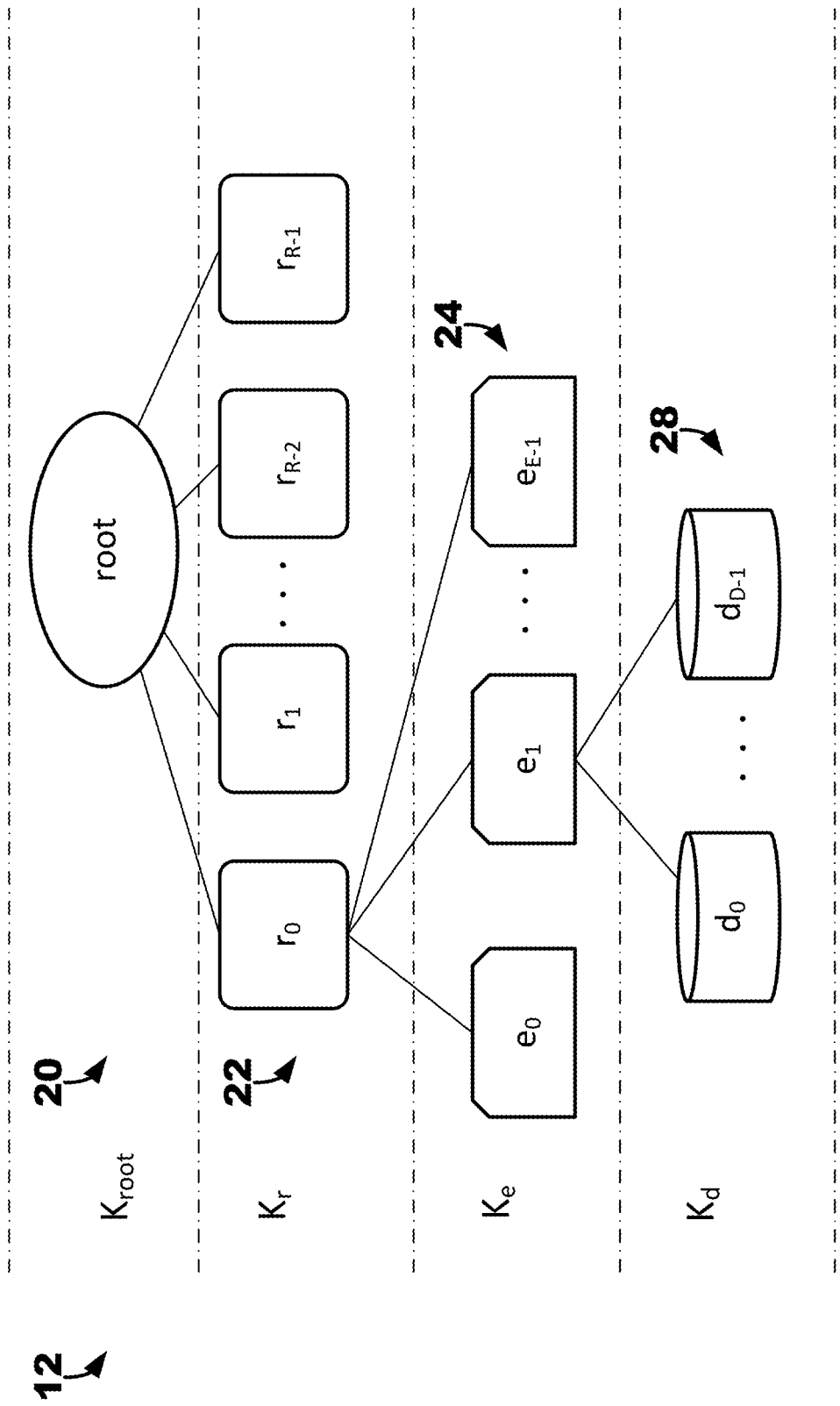
FIG. 1 is a diagram of an illustrative failure domain tree.

The disclosure herein relates to data distribution within a failure domain tree, and further to systems, apparatus, and methods for performing and implementing such data distribution within a failure domain tree. A failure domain tree, as will be further described herein, may be defined as data storage resources arranged, or distributed, across a storage hierarchy extending from a root level to a storage level. The root, or top, level may be a rack or a data center, and the storage level may be an individual data storage device such as, e.g., a disk drive (e.g., solid-state memory, hard magnetic discs, floppy discs, magnetic tapes, optical discs, integrated circuits, volatile memory, nonvolatile memory, etc.). Levels between the root level and the storage level may include controllers, enclosures, drawers, expanders, etc. Further, a failure domains tree (FDT) may be defined as a collection of various hardware resources, such as, e.g., racks, enclosures, etc., that loss of any of which can potentially cause data unavailability. Further details regarding an illustrative failure domain tree will be described herein with respect to the FIG. 1.

Data may be stored with a storage hierarchy according to various techniques, processes, and algorithms. For example, data may be stored according to parity declustering. In parity declustering, a pool of P disks may be divided into groups, each of size G, and each group may be self-sufficient for supporting K failures within the group. K may be referred to has a failure recovery value for the group. This can be achieved if K members of the group hold the parities calculated over remaining G-K members. For example, if P=18, and G=6 and all K failures are in the same group, then reconstructing data from the failed disks requires data from the remaining of G-K disks of the group. Such repair scheme may lead to inferior performance of repair as well as input/output (I/O) due to following at least the reasons: repair performance is restricted by the I/O bandwidth of G-K devices, as well as by that of hot spares, any I/O on surviving disks of the affected group is hampered due to repair process, and all of the surviving disks have to participate in reconstruction of all of the failed disks.

Parity declustering ensures that I/O bandwidth of all P-K surviving disks is utilized, which can improve the repair performance. Additionally, parity declustering may ensure that not all the surviving disks have to be involved in repair of every data block (e.g., a data block representing the basic unit of data storage) of a failed disk, which may also improve I/O performance during repair.

Parity declustering can be done if groups are formed, not at the level of disks, but at the level of blocks. Thus, each block of a disk may belong to a different group, and together the blocks may span an entire pool of P devices.

The ratio of surviving disks on which the recovery of a failed block depends to the total number of surviving disks is a crucial factor in recovery performance. Let $$\lambda = \frac{G-K}{P-K}$$

represent this ratio (i.e., surviving disks on which the recovery of a failed block depends on the total number of surviving disks). Then the rate of repair is inversely proportional to $\lambda$:

$$R_{repair} \alpha \frac{1}{\lambda}.$$

For example, G blocks of one group consist of N data blocks, K parity blocks, and S spare blocks (e.g., spare blocks are blocks on which repaired data will be stored). In this example, it may be further assumed that the required tolerance at various levels of hardware objects with a data storage hierarchy (e.g., listed from a top level to a bottom level: racks, enclosures, controllers, and disks) within which the G blocks are to be stored is provided. The illustrative systems, apparatus, and methods described herein may be able to support the provided tolerances while still operating at lower $\lambda$.

For instance, to support failure of racks, i.e., the top level of storage hierarchy in this example, K, i.e., the number of parity blocks in a group, may be the same as the maximum number of disks any one rack can hold. However, such arrangement may lead to large G and hence large $\lambda$, which is not preferable.

The illustrative systems, apparatus, and methods described herein may be described as supporting failure of any K in a pool of P disks, if and for that if we need at most G of the remaining (P-K) disks, then parity declustering demonstrates that maintaining a smaller ratio G/(P-K) will increase the performance of recovery. Further, illustrative systems, apparatus, and methods described herein may be described as providing a way to support failures at hardware levels higher than the storage, or disk, level such as, e.g., controllers, enclosures, racks, controllers, etc., and also operating at a lower ratio of G/(P-K). Thus, the illustrative systems, apparatus, and methods may be able to achieve resilience across the hierarchy of hardware domains without affecting recovery performance.

As will be further described herein, hardware resources (e.g., disks, controllers, enclosures, racks, clusters, etc.) may form, or define, a failure domain tree, or hierarchy, and each level of failure domain tree may represent one type of hardware resource. The disks may be at the lowest, or leaf, level of the failure domain tree. A tolerance vector, or value, and a size of the height of failure domain tree may be provided, e.g., by a user. Each tolerance vector, or value, represents the expected failures to be supported at that level in the failure domain tree. For example, at an enclosure level of a failure domain tree, the tolerance vector may be two representing that two enclosures of the enclosure level may be expected to fail.

The illustrative systems, apparatus, and methods may be described as "chopping" a data into a collection of data objects or parity groups. Each data object, or parity group, may consist of file data along with parities calculated over that data. The file data and parities of the data object are then distributed through a failure domain tree. In at least one embodiment, a mechanism, or process, may be used to decide how to distribute the data blocks of these data objects, and which hardware resources to use for each data object. Additionally, it is be understood that each data object or parity group may generally include data blocks, parity blocks, and spare blocks. The amount of parity blocks of a data object, or parity group, may be referred to as a failure recovery value.

The illustrative systems, apparatus, and methods may be further described as providing failure domain trees that support data object resilience for failure of hardware objects of a storage tree including but not restricted to racks, enclosures, controllers, and disks.

An illustrative failure domain tree 12 is depicted in FIG. 1. The failure domain tree 12 extends from a top failure domain level (FDL) 20 to a bottom FDL 28. In this example, root is the top FDL 20 and a plurality of data storage devices, or disks, $d_0 \ldots d_{D-1}$ is the bottom FDL 28. The root of the top FDL 20 may represent the highest level, single point of contact for the failure domain tree 12. For example, the root of the top FDL 20 may be the point in the failure domain tree 12 were all data requests (e.g., writes, reads, etc.) flow through. In one or more embodiments, the root of the top FDL 20 may be a virtual root.

In this example, three FDLs are positioned below the top FDL 20 as follows: a rack failure domain level 22 including, for example, a plurality of data storage racks $r_0 \ldots r_{R-1}$, each operably coupled to a plurality of enclosures; an enclosure failure domain level 24 including, for example, a plurality of data storage enclosures, each operably coupled to a plurality of data storage devices (only the enclosures $e_0 \ldots e_{E-1}$ operably coupled to rack $r_0$ are depicted for simplicity); and a data storage device failure domain level 28 including, for example, a plurality of data storage devices (only the data storage devices $d_0 \ldots d_{D-1}$ operably coupled to enclosure $e_1$ are depicted for simplicity).

Each of item, or device, of each FDL of the failure domain trees described herein may be referred to as nodes. For instance, in this example of FIG. 1, the root is a node, the data storage racks $r_0 \ldots r_{R-1}$ are nodes, data storage enclosures $e_0 \ldots e_{E-1}$ are nodes, and the data storage devices $d_0 \ldots d_{D-1}$ are nodes. It may be described each FDL may include at least one node operably coupled to a node in the FDL thereabove. For example, the data storage device FDL 28 includes a plurality of the data storage devices $d_0 \ldots d_{D-1}$ operably coupled to a node, i.e., enclosure $e_1$. Further, for example, the enclosure FDL 24 includes a plurality of the enclosures $e_0 \ldots e_{E-1}$ operably coupled to a node, i.e., a rack $r_0$. The bottom FDL, the data storage device FDL 28, may be configured to be the node level where data is stored.

Each of the FDLs may define a failure tolerance value, which may be represented by the K value located on the left side of the FDL in FIG. 1. The illustrative systems, apparatus, and methods may include distributing a plurality of data blocks of a data object across each FDL in such a way to provide tolerance K at each FDL. For example, a plurality of data blocks of a data object may be distributed across a number of racks in such a way to provide a prescribed failure tolerance value $K_r$ at the rack FDL 22. Similarly, at each rack, incoming data blocks, or units, are distributed into enclosures in such a way to provide a prescribed failure tolerance value $K_E$ at the rack FDL 24. Thus, a data object, or parity group, can potentially have data blocks from disks spanning different hardware domains.

Figure 2:
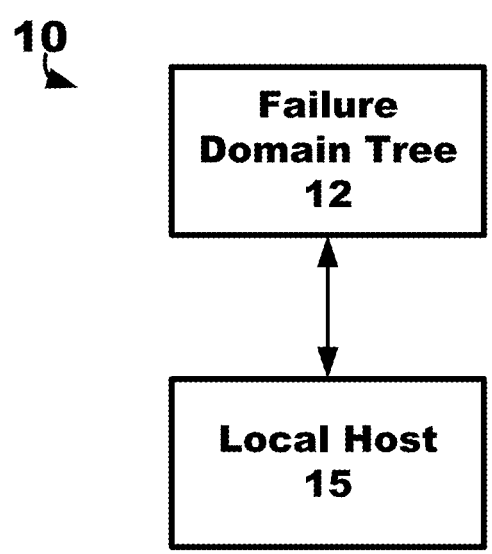
FIG. 2 is a diagram including an illustrative device for use in data distribution within a failure domain tree.

An illustrative system 10 that can be used in the embodiments described herein is depicted in FIG. 2. The illustrative system 10 may include a failure domain tree 12 operably coupled to a local host 15, e.g., for transferring data therebetween, as shown in FIG. 2. For example, the local host 15 may request data from the failure domain tree 12, and the failure domain tree 12 may provide such requested data to the local host 15 or the local host 15 may send data to the failure domain tree 12 to be stored. In at least one embodiment, the local host 15 is a computer (such as, e.g., a personal computer, server, etc.). The systems, apparatus, and methods disclosed herein may be generally described in the context of illustrative system 10 and/or systems such as system 10 including a failure domain tree 12, but that should in no way be taken as limiting the scope of the present disclosure.

The failure domain tree 12 may be defined as a set of hardware resources arranged in a hierarchy from a top level to a bottom level configured to store data across a plurality of data storage devices, which may comprise the bottom level of the hierarchy. An illustrative failure domain tree 12 is described herein with reference to FIG. 1.

The illustrative systems, apparatus, and methods may be executed, or performed, by one or more processors. The processors may include various circuitry, logic, memory, etc. for use in the generating and using failure domain trees, storing data, reading data, etc. For example, the processors may include one or more circuit components such as integrated circuits, processors, etc. that may be part of the system 10 (e.g., part of the failure domain tree 12, part of the local host 15, etc.).

The methods, techniques, and/or processes described in this disclosure, including those attributed to the processor, or various constituent components, may be implemented, at least in part, in hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. The term "processing apparatus," "processor," or "processing circuitry" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices, and techniques described in this disclosure may be embodied as instructions on a computer-readable medium such as RAM, ROM, NVRAM, EEPROM, FLASH memory, STRAM, RRAM, magnetic data storage media, optical data storage media, or the like. The instructions may be executed by one or more processors to support one or more aspects of the functionality described in this disclosure. It to be understood that a controller comprising one or more processors to execute, or perform, the illustrative methods, processes, and algorithms described herein may be part of, or included with, one or more of the local host 15, the failure domain tree 12, and any other part of the system 10 not depicted in FIG. 2.

Before proceeding, a few terms in this disclosure may be defined. A data object, which may also be referred to as a parity group, may be defined as a group of data blocks that contains data blocks, parity blocks, and spare blocks. A failure domain tree (FDT) may be symmetric and described as being a symmetric FDT if all nodes at the same failure domain level have a same number of children nodes. A FDT may be asymmetric and described as being an asymmetric FDT if the failure domain tree is not symmetric.

In one or more embodiments, the illustrative systems, apparatus, and methods may be described in terms of a Constraint A and a Claim B. The Constraint A includes distributing n data blocks over b buckets such that for any number, k, $\leq$b, the sum of data blocks across the first k buckets (in descending order of data blocks held) is minimum. The Claim B is, if distributing all data blocks uniformly in the sense that each bucket gets a floor, $\lfloor n/b \rfloor$, data blocks and the remaining, r (r=n mod b), data blocks are distributed over any r of the b buckets each getting a single data block, then the result will satisfy the Constraint A.

An illustrative case may be when a group of data blocks is distributed over a set of disks, and there is no other failure domain to be considered. If this group of data blocks is distributed uniformly over these disks and if the required tolerance for disks is $K_D$, then the illustrative methods and processes may only need to check if the sum of the data blocks in first $K_D$ disks (when ordered descending) is less than or equal to K, which is the parity data blocks present in a single data object or parity group. This is because the Claim B guarantees that the uniform distribution will have the minimum sum of blocks over the first $K_D$ disks.

Figure 3:
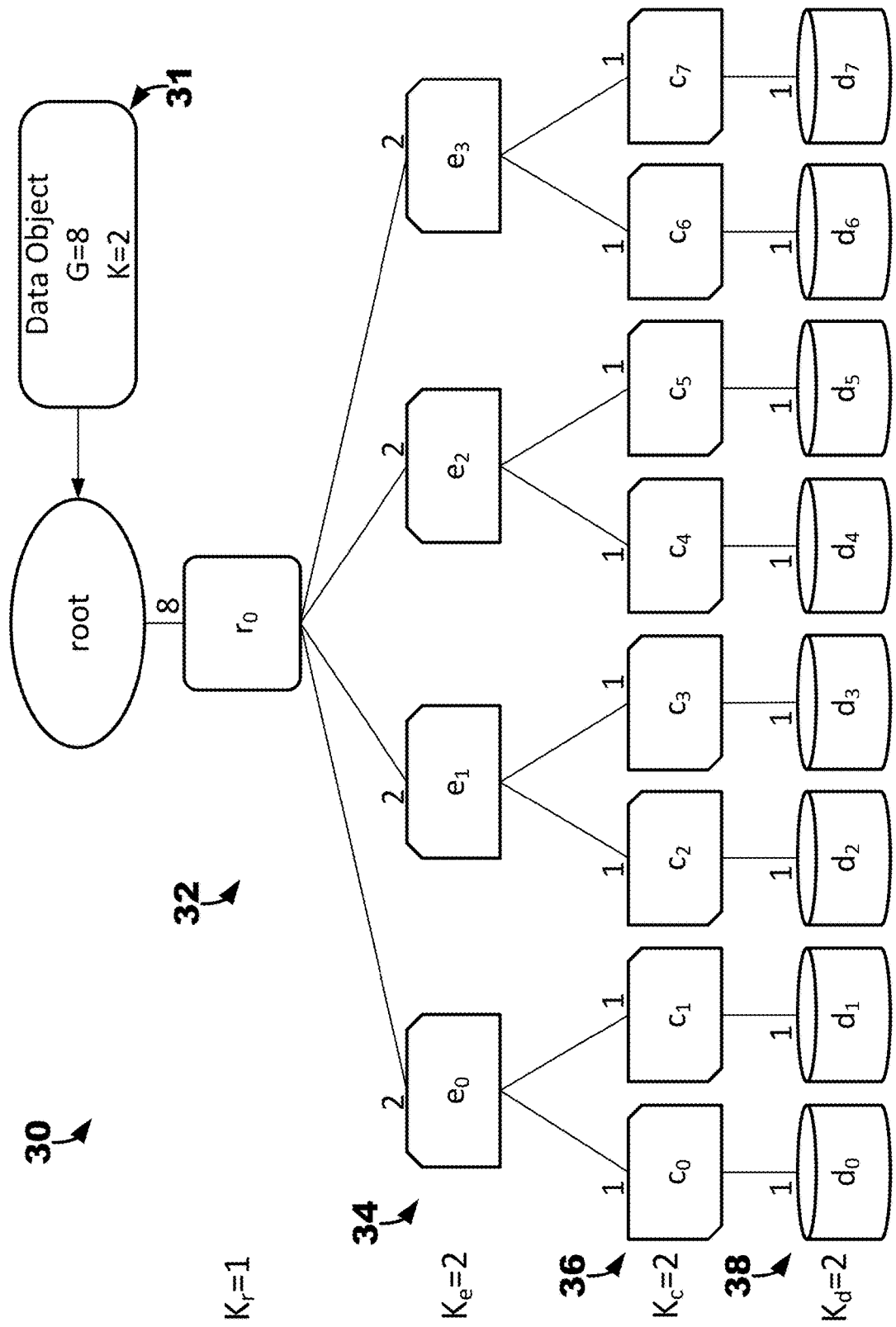
FIG. 3 is a diagram of an illustrative symmetric failure domain tree.

An illustrative symmetric failure domain tree 30 is depicted in FIG. 3. To distribute data blocks of a data object, or parity group, into a symmetric FDT 30, the illustrative systems, apparatus, and methods may start with the root having G data blocks to distribute, and each node may uniformly distribute the data blocks it receives from its parent among its children. Once this distribution is over, one can order nodes at each level in descending order of data blocks they hold, then the failure tolerance level, $K_L$, may be checked to determine if it, $K_L$, results in a number of failed data blocks that exceeds K, the number of parity blocks in a group also referred to as the failure recovery value. If failure of $K_L$ nodes would result in a number of failed data blocks less than or equal to K, then $K_L$ failures at that FDL can be satisfied. In other words, if failure of $K_L$ nodes would result in a number of failed data blocks that exceeds K, then $K_L$ failures at that FDL cannot be satisfied.

In the illustrative symmetric FDT 30 shown in FIG. 3, racks, enclosures, controllers, and disks are represented by r, e, c, and d, respectively, and the required failure tolerance levels, $K_r$, $K_e$, $K_c$, and $K_d$ of each FDL are shown on the left side. In this example, a data object, or parity group, 31 defining a size, G=8, and a number of parity data blocks, K=2, may be stored in the FDT 30. The number of data blocks each node receives from its parent node is indicated above each node. As shown, in the rack failure domain level 32, all 8 data blocks are received from its parent, i.e., root. Further, in the rack failure domain level 32, it not possible to meet the failure tolerance value, $K_r$=1, as all blocks are going to a single rack. More specifically, if one rack (in this example, the sole rack) fails, all eight data blocks would be unavailable, which exceeds two that is the minimum number of data blocks needed to rebuild the data object (i.e., because K=2 in the data object 31).

Similarly, the failure tolerance level $K_e$=2 at the enclosure failure domain level 34 is not feasible, as the number of data blocks from the first $K_e$ enclosures, i.e., four data blocks, exceeds K=2. On the other hand, the failure tolerance levels at controller and data storage device failure domain levels 36, 38 is be satisfied as failure of two nodes in each level would only result in two data block failures, which equals the maximum required K value (i.e., K=2 in the data object 31).

Figure 4:
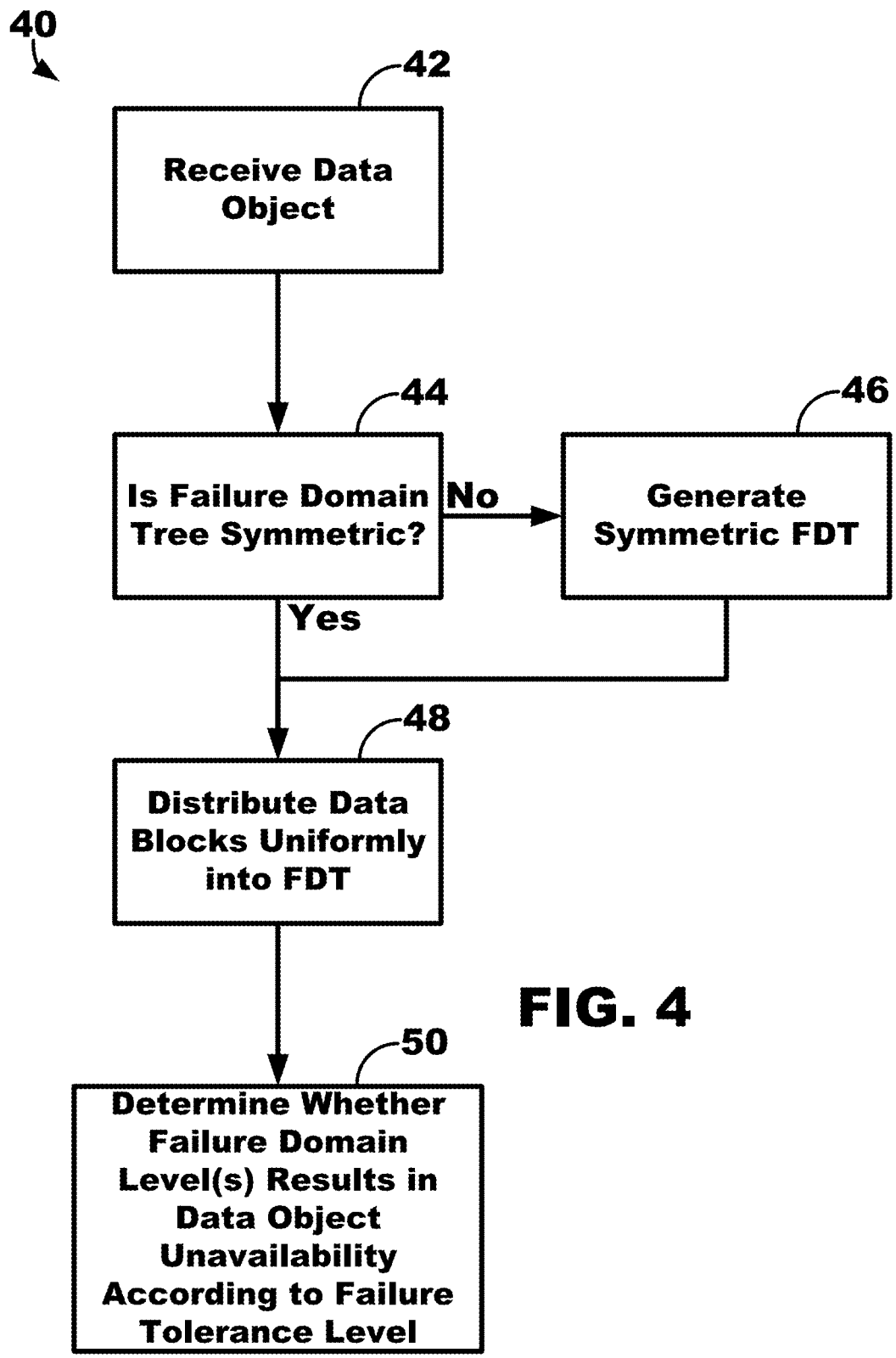
FIG. 4 is a flow diagram of an illustrative method of data distribution into a failure domain tree.

An illustrative method 40 of data distribution into a failure domain tree is depicted in FIG. 4. The method 40 may receive a data object 42, e.g., from the local host 15, to be stored in a failure domain tree such as depicted in FIGS. 2-3.

The method 40 may then determine if the failure domain tree is symmetric 44 to determine whether the failure domain tree should be modified, or adjusted, to provide a symmetric failure domain tree. As described herein, a failure domain tree may be symmetric and described as being a symmetric failure domain tree if all nodes at the same level have a same number of children nodes, and a failure domain tree may be asymmetric and described as being an asymmetric failure domain tree if the failure domain tree is not symmetric.

Figure 5:
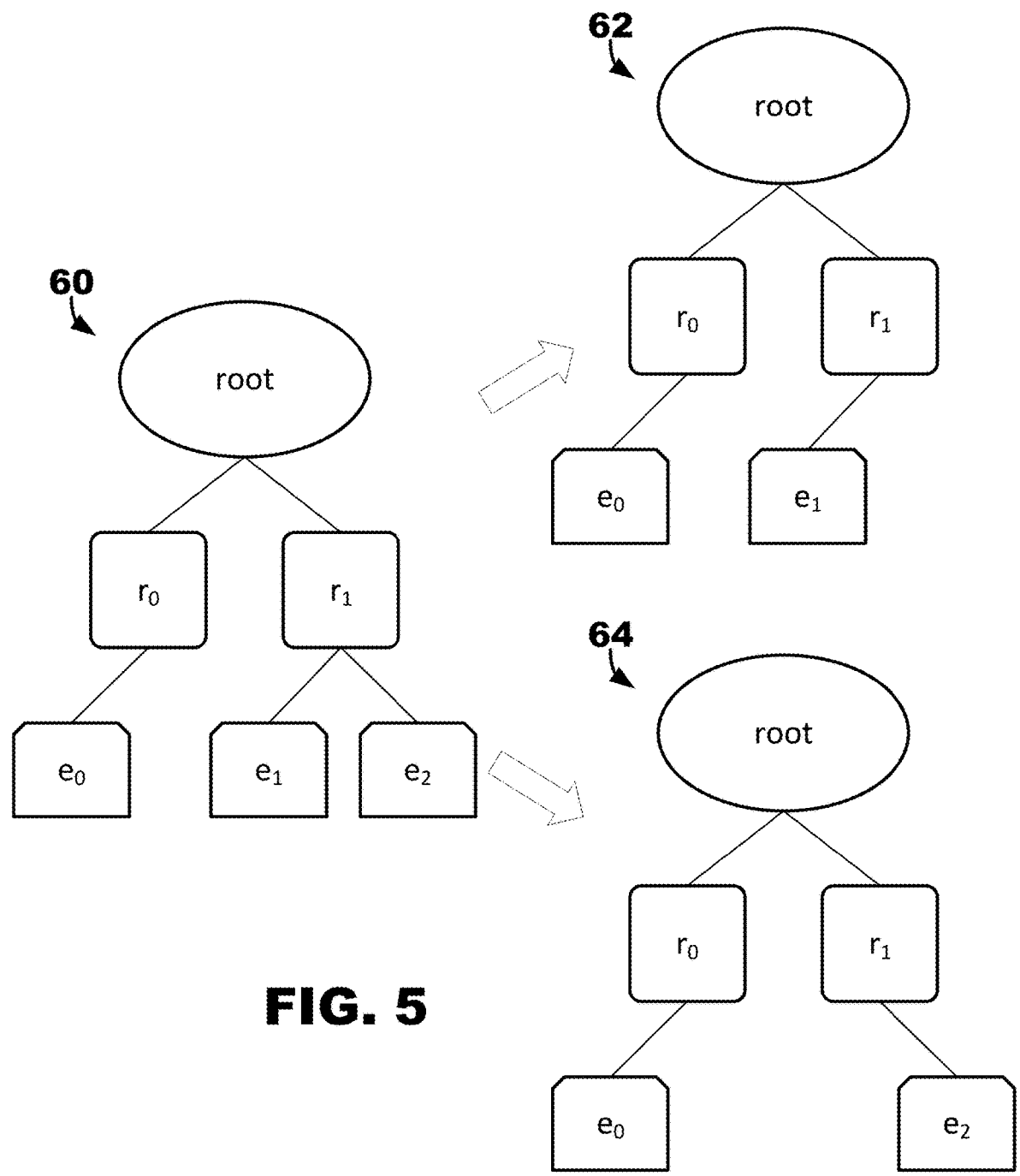
FIG. 5 is a diagram of an asymmetric failure domain tree being used to generate two symmetric failure domain trees.
Figure 6:
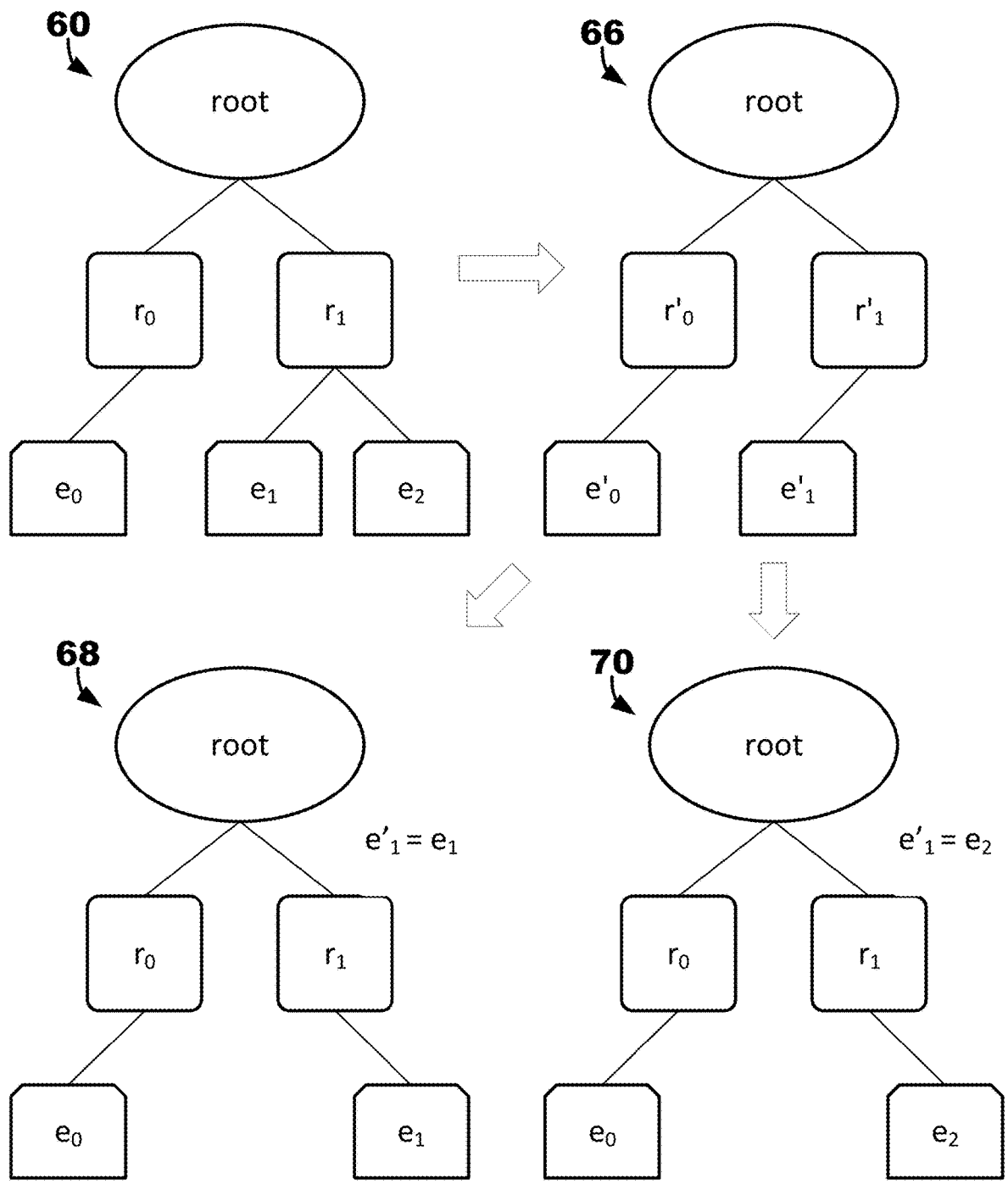
FIG. 6 is a diagram of an asymmetric failure domain tree being used to generate a virtual symmetric failure domain tree, and then two symmetric failure domain trees therefrom.

More specifically, if it determined that the failure domain tree upon which the data object is to be stored is not symmetric 44, then the method 40 may proceed to generating a symmetric failure domain tree 46 as will be further described herein with respect to FIGS. 5-6. If it determined that the failure domain tree upon which the data object is to be stored is symmetric 44 or a symmetric failure domain tree has been generated 46, then the method 40 may proceed to distributing the data blocks uniformly into the symmetric failure domain tree 48.

Uniformly distributing the data blocks of the data object across the symmetric failure domain tree 48 may be performed in a few different ways. For example, as described herein, the illustrative systems, apparatus, and methods may distribute data blocks uniformly according to a Constraint A and a Claim B. The Constraint A may include distributing n data blocks over b buckets (e.g., each level of the FDT, the lowest level in the FDT, etc.) such that for any number, k, ≤b, the sum of data blocks across the first k buckets (in descending order of data blocks held) is minimum. The Claim B is, if distributing all data blocks uniformly in the sense that each bucket gets floor, n/b, data blocks and the remaining, r (r=n % b), data blocks are distributed over any r of the b buckets each getting a single data block, then the result will satisfy the Constraint A.

Further, for example, as described herein, the illustrative systems, apparatus, and methods may, for each failure domain level of a failure domain tree, distribute an equal number of data blocks to each node within the failure domain level if a number of data blocks (G) is evenly divisible by a number of nodes of a FDL. Further, for each FDL of a FDT, if a number of data blocks (G) is not evenly divisible by a number of nodes of a FDL, an equal number of data blocks may be distributed to each node within the FDL and then each data block of the remaining data blocks may be distributed uniformly to a different node within the FDL until no data blocks are remaining.

The "buckets" may represent the nodes at each FDL of a FDT. For example, in the lowest level of the FDT, i.e., the storage device level, the "buckets" are the data storage devices (e.g., disk drives). For example, if a data object including 26 data blocks (G=26) is to be stored in a failure domain and the failure domain tree includes 12 storage devices in the lowest level, then 10 storage devices would receive and store two data blocks and two storage devices would receive and store three data blocks. Further, for example, if a data object including 39 data blocks (G=39) is to be stored in a failure domain and the failure domain tree includes 10 storage devices in the lowest level, then one storage device would receive and store three data blocks and nine storage devices would receive and store four data blocks.

The method 40 may include determining whether failure domain level would result in data object unavailability according to the failure tolerance value of the failure domain level if the data object were stored within the failure domain tree 50. This process 50 may occur prior to, after, or when the data object being stored within the failure domain tree. As described herein, each of the failure domain levels may define a failure tolerance value that represents failure tolerance of the nodes of the failure domain level. For example, in a storage device failure domain level, the failure tolerance value may be defined as four, which indicates that the failure tolerance of the storage device failure domain level is four storage devices. In other words, the hardware of the storage device failure domain level is prescribed to have a tolerance of four storage device failures (which results in unavailability of data from such failed storage devices).

Further, for example, in an enclosure failure domain level, the failure tolerance value may be defined as two, which indicates that the failure tolerance of the enclosure failure domain level is two enclosures. In other words, the hardware of the enclosure failure domain level is prescribed to have a tolerance of two enclosure failures (which results in unavailability of all data from such failed enclosures).

As represented by processes 44, 46, 48 in FIG. 4, when the failure domain tree is asymmetric, storage of a data object therein may be described as a two-stage solution. In the first stage (e.g., process 46), a symmetric tree is generated, or "factored off," a given asymmetric tree. In the second stage (e.g., process 48), the data objects, or parity groups, are distributed over this symmetric failure domain tree that was generated, or "factored out," in the first stage. It is be understood that there are various ways in which a symmetric tree can be generated from an asymmetric tree, a few illustrative ways of which are described herein.

Illustrative examples of generating symmetric failure domain trees from asymmetric failure domain trees are depicted in FIGS. 5-6. One process, or way, of generating symmetric failure domain trees from asymmetric failure domain trees may be described as a "tune node degrees to the least degree node," which is depicted in FIG. 5. In this process, at each failure domain level, the node with the least number of children may be considered, and the number of children of such node may be $d_L$. For other nodes at that "child" level, only $d_L$ children may be "kept" by each parent to provide, or generate, the symmetric tree.

In other words, for each FDL of the asymmetric failure domain tree, a minimum number of nodes in the FDL that are operably coupled to a same node in the FDL thereabove may be determined. Then, any nodes in the FDL exceeding the minimum number that is operably coupled to a same node in the FDL thereabove may be removed from the failure domain tree.

Such processes, or methods, can lead to a large number of possible symmetric trees. Such symmetric failure domain trees can be pre-generated, and the files/objects created on the system can be assigned any one of the pre-generated symmetric trees, or such symmetric failure domain trees can be generated on-demand.

With reference to FIG. 5, an asymmetric failure domain tree 60 may be provided and two symmetric failure domain trees 62, 64 may be generated therefrom. The asymmetric failure domain tree 60 includes two failure domain levels below root, and is asymmetric because the two nodes, $r_0$ and $r_1$, at the same level, do not have the same number of children nodes. In particular, $r_0$ has one child node, i.e., $e_0$, while $r_1$ has two child nodes, i.e., $e_1$, $e_2$.

As shown, the symmetric failure domain trees 62, 64 may be generated, or "factored out," by determining the minimum number of children at the nodes $r_0$, $r_1$ level is 1 as $r_0$ includes, or is operably coupled to, a single child node, i.e., $e_0$. Thus, the number of children nodes "kept" by each of the nodes $r_0$, $r_1$ in the symmetric failure domain trees 62, 64 is one. As such, the node $r_1$ of the first symmetric failure domain tree 62 kept one of its child nodes, $e_1$, while removing its other child node, $e_2$. Further, the node $r_1$ of the second symmetric failure domain tree 64 did the opposite of the first symmetric failure domain tree 62; that is, the node $r_1$ kept one of its child nodes, $e_2$, while removing its other child node, $e_1$.

Another process, or way, of generating symmetric failure domain trees from asymmetric failure domain trees may be described as a "bottom-up method" in which starting from the penultimate level, the node causing the asymmetry can be taken away from the level. In other words, for each failure domain level of the asymmetric failure domain tree starting at the bottom failure domain level and progressing toward the top failure domain level, any nodes in the failure domain level causing asymmetry may be removed.

This way may lead to asymmetry in failure domain levels above, and such affected nodes from those levels can also be taken away. In this "bottom-up method," if all nodes at a failure domain level have a different number of child nodes, then after the "bottom-up method" is employed, then the "tune node degrees to the least degree node" may further be employed. Thus, a symmetric failure domain tree may be generated for each of the removed nodes according to the processes described with reference to FIG. 5.

Another process, or way, of generating symmetric failure domain trees from asymmetric failure domain trees may include generating one or more virtual symmetric failure domain trees using the asymmetric failure domain tree, and then generating one or more symmetric failure domain trees using the one or more virtual symmetric failure domain trees as shown in FIG. 6. Virtual symmetric failure domain trees may be referred to as "virtual" because virtual symmetric failure domain trees do not exist in actual hardware resources (e.g., racks, enclosures, storage devices, etc.), and instead, are virtual constructs about which hardware resources can be mapped thereto.

In one embodiment, a virtual symmetric tree is constructed using "tune node degrees to the least degree node" process. Thus, if the degree of least degree node at level L is $d_L$, then this virtual symmetric tree will have all nodes at level L with degree $d_L$. When a data object, or parity group, is mapped to hardware resources, the actual mapping between nodes from the input asymmetric failure domain tree and this virtual failure domain tree may take place using one or more processes that use the data object index as input.

As shown in FIG. 6, an asymmetric failure domain tree 60 is provided (same as depicted in FIG. 5) and a virtual symmetric failure domain tree 66 is generated therefrom using the same processes described herein with respect to FIG. 5, e.g., tuning the degree of nodes to the least degree node of the same level. The virtual nodes of the virtual symmetric failure domain tree 66 are designated by prime symbols to indicate that such nodes are not representative of actual, hardware resources, and are instead a virtual construct.

Then, two possible failure domain trees 68, 70 using actual, hardware resources can be generated using the virtual symmetric tree 66. In other words, actual hardware resources may be mapped to the virtual symmetric tree 66. For example and more specifically, the symmetric failure domain tree 68 maps $e'_1$ from the virtual failure domain tree 66 to $e_1$ and the failure domain tree 70 maps $e'_1$ from the virtual failure domain tree 66 to $e_2$. Thus, two symmetric failure domain trees 68, 70 are generated using actual hardware resources using the virtual symmetric tree 66. In one or more embodiments, such generation can be done at run-time.

After one or more symmetric failure domain trees are provided or generated, data objects may be stored thereon using the illustrative systems, apparatus, and methods. FIGS. 7A-7B and FIGS. 8A-8B provide illustrative examples of storage of data objects into failure domain trees using various data distribution processes.

Figure 7A:
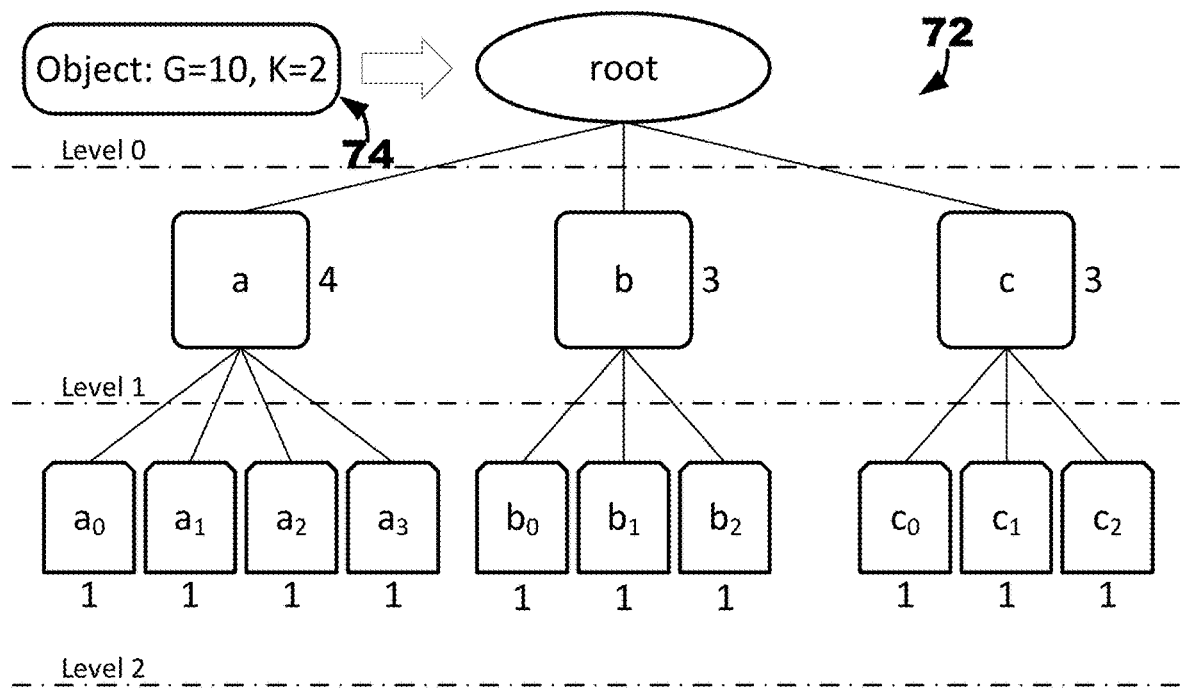
FIG. 7A is a diagram of a distribution of data within an asymmetric failure domain tree.
Figure 7B:
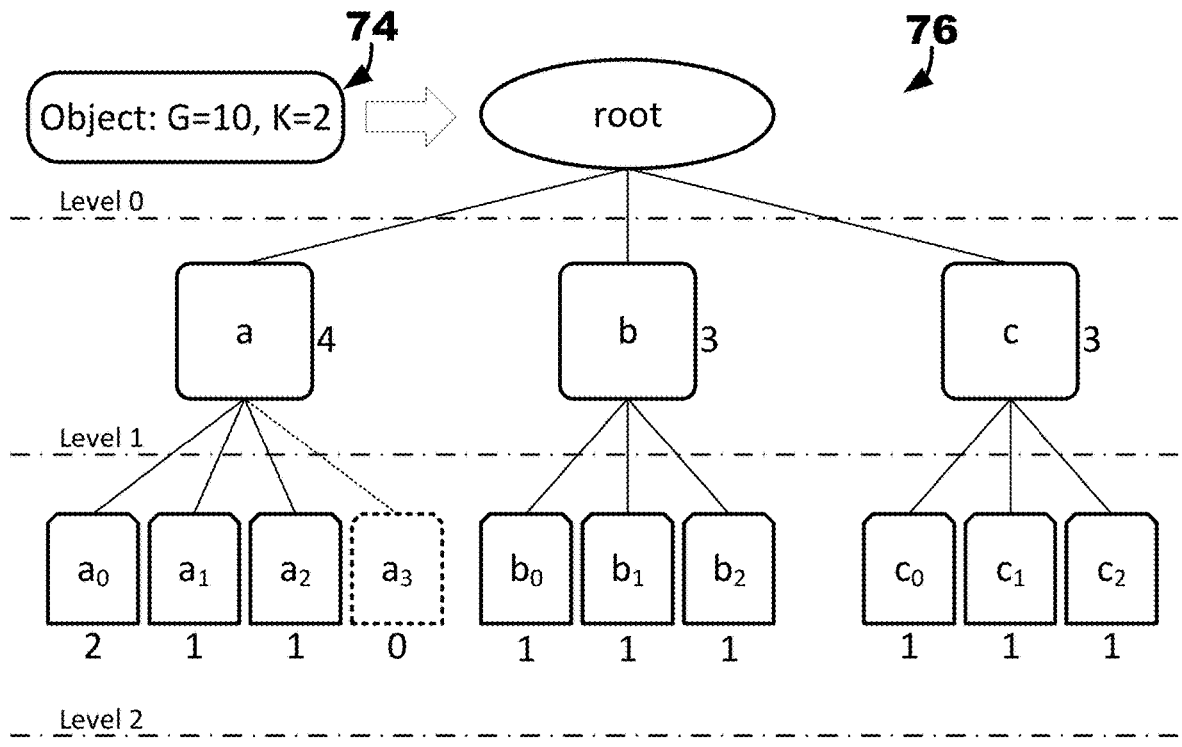
FIG. 7B is a diagram of a distribution of data within a symmetric failure domain tree.

The examples of FIGS. 7A-7B utilize an asymmetric failure domain tree 72 having, or defining, three failure domain levels including a root level at level 0 (in other words, a tree with the height of two from root). At failure domain level 1, the failure domain tree 72 includes three nodes (a, b, c), and at failure domain level 2, the failure domain tree 72 includes ten nodes ($a_0$, $a_1$, $a_2$, $a_3$, $b_0$, $b_1$, $b_2$, $c_0$, $c_1$, $c_2$). A data object 74 defining, or having, a size of ten data blocks (G=10) including two parity data blocks (K=2) is provided for storage within the failure domain tree 72. Thus, simultaneous failure of more than two (i.e., three or more) stored data blocks would result in failure of recovery of the data object 74.

As shown in the data distribution processes as depicted in FIG. 7A, the data object 74 is distributed as per the underlying asymmetry of the failure domain tree 72. Node a receives four data blocks as it has that many child nodes, and the same logic applies to node b and node c as each receives three data blocks (the number of data blocks received, or distributed to, each node at failure domain level 1 is indicated numerically to the right of the node). At subsequent levels, all nodes pass on a single data block unit per child, and in the end, all leaf nodes at failure domain level 2 contain one data block or unit (the number of data blocks received, or distributed to, each node at level 2 is indicated numerically below the node). Thus, the data distribution processes as depicted in FIG. 7A provides a tolerance of two node failures at failure domain level 2 (e.g., because each node at level 2 stores a single data block and K=2) and zero failures at failure domain level 1 (e.g., because failure of any node at level 1 would result in a minimum of three data block failures which exceeds two).

The data distribution processes depicted in FIG. 7B utilize the illustrative systems, apparatus, and methods to store the data object into a failure domain tree that is symmetric. More specifically, node $a_3$ of failure domain level 2 is "factored out," or removed, from the asymmetric failure domain tree to provide a symmetric failure domain tree 76 (node $a_3$ of failure domain level 2 is depicted using dotted lines to indicate its removal).

Thus, each of the root's child nodes, i.e., nodes a, b, c, would have, or be operably coupled to, three nodes below them. When distributing the ten data blocks of the data object 74 into the symmetric failure domain tree 76, one of the three nodes a, b, or c at failure domain level 1 would receive four data blocks, and the remaining nodes at failure domain level 1 will receive three data blocks each (the number of data blocks received, or distributed to, each node at failure domain level 1 is indicated numerically to the right of the node). In this example, node a has received four data blocks, and thus, in this symmetric failure domain tree, at least one leaf node $a_0$ of failure domain level 2 receives two data blocks of the data object 74 (the number of data blocks received, or distributed to, each node at failure domain level 2 is indicated numerically below the node). Thus, the data distribution processes as depicted in FIG. 7B provides a tolerance of one failure at failure domain level 2 (e.g., because at least one node at failure domain level 2 stores two data blocks and K=2) and zero failures at failure domain level 1 (e.g., because failure of any node at level 1 would result in three data block failures, which is greater than two).

As shown in this illustrative example depicted in FIGS. 7A-7B, it is impossible to achieve any tolerance for level 1 of the failure domain trees 72, 76 when receiving data object 74. In at least one embodiment, level 1 could be skipped altogether and it may be assumed that its descendants are directly connected to the root or level 0. This is so because if it is impossible to achieve any non-zero tolerance for a given level, then it is impossible to achieve any non-zero tolerance for any of the levels above. Such illustrative technique may be utilized by any level other than the root level.

Figure 8A:
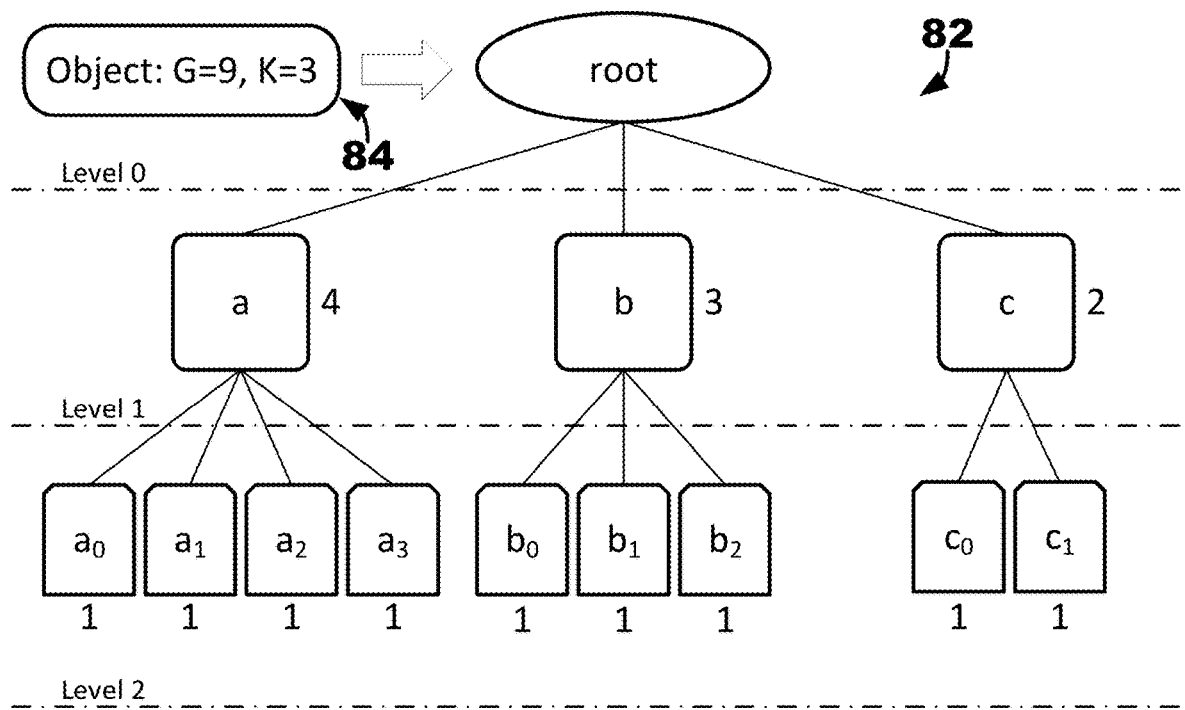
FIG. 8A is a diagram of a distribution of data within an asymmetric failure domain tree.
Figure 8B:
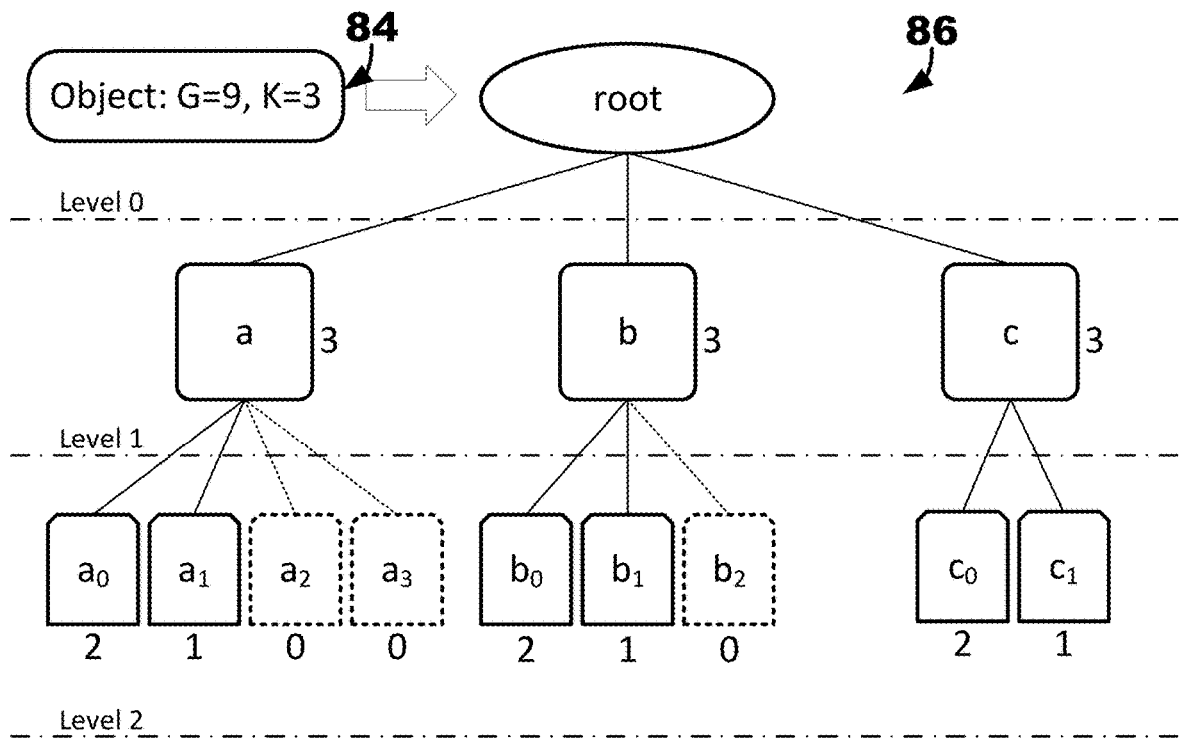
FIG. 8B is a diagram of a distribution of data within a symmetric failure domain tree.

The examples of FIGS. 8A-8B utilize an asymmetric failure domain tree 82 having, or defining, three failure domain levels including a root level at failure domain level 0 (in other words, a tree with the height of two from root). At failure domain level 1, the failure domain tree 82 includes three nodes (a, b, c), and at failure domain level 2, the failure domain tree 82 includes nine nodes ($a_0$, $a_1$, $a_2$, $a_3$, $b_0$, $b_1$, $b_2$, $c_0$, $c_1$). A data object 84 defining, or having, a size of nine data blocks (G=9) including three parity data blocks (K=3) is provided for storage within the failure domain tree 82. Thus, simultaneous failure of more than three (i.e., four or more) stored data blocks would result in failure of recovery of the data object 84.

As shown in the data distribution processes as depicted in FIG. 8A, the data object 84 is distributed as per the underlying asymmetry of the failure domain tree 82. Node a receives four data blocks as it has, or is operably coupled to, that many child nodes therebelow, node b receives three data blocks as it has, or is operably coupled to, that many children nodes therebelow, and node c receives two data blocks as it has, or is operably coupled to, that many children nodes therebelow (the number of data blocks received, or distributed to, each node at failure domain level 1 is indicated numerically to the right of the node). At subsequent levels, all nodes pass on a single data block unit per child, and in the end, all leaf nodes at failure domain level 2 contain one data block or unit (the number of data blocks received, or distributed to, each node at failure domain level 2 is numerically indicated to below the node). Thus, the data distribution processes as depicted in FIG. 8A allows a tolerance of three failures at failure domain level 2 (e.g., because each node at level 2 stores a single data block and K=3) and zero failures at level 1 (e.g., because failure of node a would result in greater than three data block failures).

The data distribution processes depicted in FIG. 8B utilize the illustrative systems, apparatus, and methods to store the data object into a failure domain tree that is symmetric. More specifically, node $a_2$, node $a_3$, and node $b_2$ of failure domain level 2 are "factored out," or removed, from the asymmetric failure domain tree to provide a symmetric failure domain tree 86 (node $a_2$, node $a_3$, and node $b_2$ of failure domain level 2 are depicted using dotted lines to indicate its removal).

Thus, each of the root's child nodes, i.e., nodes a, b, c, have, or are operably coupled to, two nodes below them. When distributing the nine data blocks of the data object 84 into the symmetric failure domain tree 86, each of the three nodes a, b, or c at failure domain level 1 receive three data blocks (the number of data blocks received, or distributed to, each node at failure domain level 1 is numerically indicated to the right of the node). Since each node at failure domain level 1 includes two child nodes and received three data blocks, one child node receives two data blocks and the other receives one data block (the number of data blocks received, or distributed to, each node at failure domain level 2 is numerically indicated below the node). For example, node $a_0$ receives two data blocks of the data object 84 and node $a_1$ receives one data block of the data object 84. Thus, the data distribution processes as depicted in FIG. 8B allows a tolerance of one failure at failure domain level 2 (e.g., because at least two nodes at failure domain level 2 stores two data blocks and K=3) and one failure at failure domain level 1 (e.g., because each node at failure domain level 1 distributes three data blocks, which is equal to the K value of three).

Figure 9:
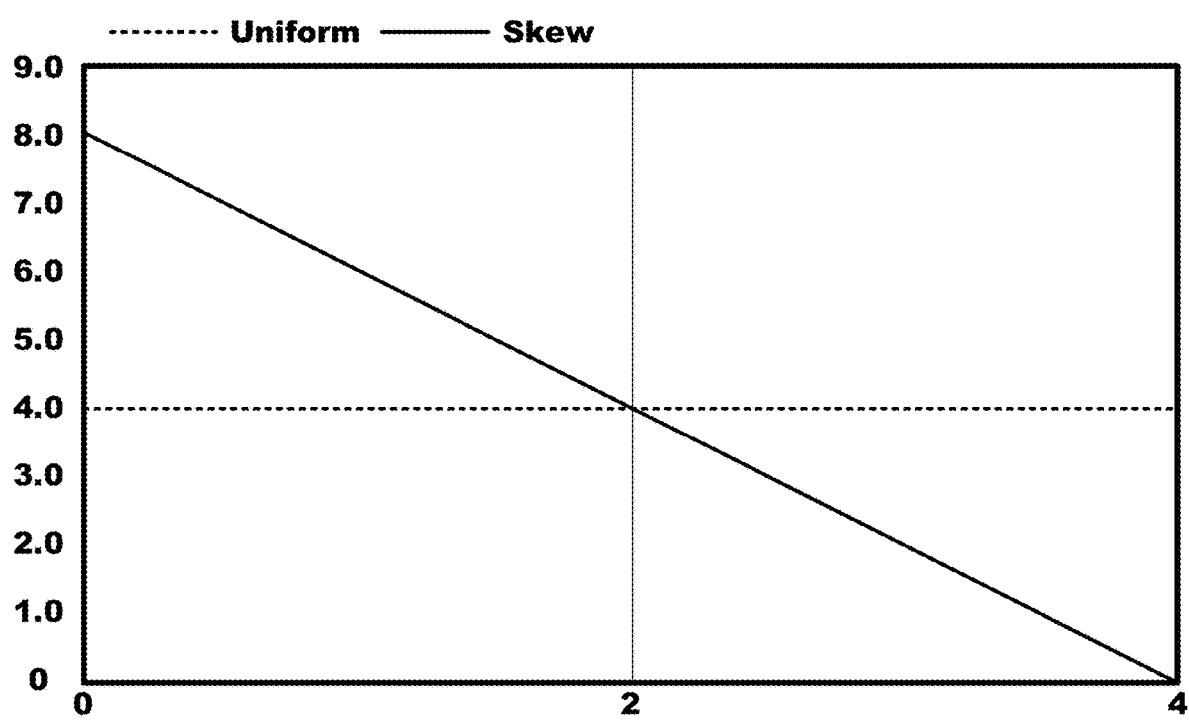
FIG. 9 is a graph of depicting illustrative continuous distribution functions.

A proof for the case of a continuous distribution function is provided below, which can be extended for the discrete case. Let u(x) (represented by a dashed line) and v(x) (represented by a solid line) be two non-increasing continuous functions over [0, X] such that area under both functions is the same as shown in the example depicted in FIG. 9. Also, let u(x) be a uniform function.

Claim 1: There exists a point $x_c \in [0, X]$ such that $u(x_c) = v(x_c)$.

Proof: The desired point won't exist if v(x) lies entirely above u(x) or entirely below u(x) over the given range. In both cases, the area under the two functions will not be the same, and hence, provides a contradiction. The continuous version of Claim B may be stated as follows:

For any $x \in [0, X]$, $$\int_0^x v(x')dx' \geq \int_0^x u(x')dx'$$

Equality being held only at x=0 and x=X.

Proof: By Claim 1, a crossover point $x_c$ exists. Let there be $x \leq x_c$ for which the claim is violated. Since v(x) lies above u(x) for $x < x_c$, the area under v(x) over [0, $x_c$] has to be greater than that under u(x) over the same range, and hence a contradiction.

Let $x>x_c$ for which the claim is violated. Since $v(x)$ lies below $u(x)$ for $x>x_c$ (due to being non-increasing), area under $v(x)$ over $[x_c, X]$ is strictly less than that under $u(x)$ over the same range. Assuming that the claim being violated at this x, the area under $v(x)$ will remain less than $u(x)$ over entire $[0, X]$, thereby violating the assumption of constant area, and hence a contradiction. Since no x can exist in $[0, X]$ that can violate the claim, the claim has been settled.

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a controller may be operably coupled to a storage device to transfer data therebetween).

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

The term "and/or" means one or all the listed elements or a combination of at least two of the listed elements.

The phrases "at least one of," "comprises at least one of," and "one or more of" followed by a list refers to any one of the items in the list and any combination of two or more items in the list.

The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

Illustrative systems, apparatus, and methods were described with reference to FIGS. 1-9. It is apparent to one skilled in the art that elements or processes from one embodiment may be used in combination with elements or processes of the other embodiments, and that the possible embodiments of such systems, apparatus, and methods using combinations of features set forth herein is not limited to the specific embodiments shown in the figures and/or described herein. Further, it will be recognized that timing of the processes and the size and shape of various elements herein may be modified but still fall within the scope of the present disclosure, although certain timings, one or more shapes and/or sizes, or types of elements, may be advantageous over others.

What is claimed is:

1. A system comprising:
    a symmetric failure domain tree comprising a plurality of failure domain levels (FDL) extending from a top FDL to a bottom FDL, each FDL comprising at least one node, the top FDL comprising a single root node, each other FDL comprising at least one node operably coupled to a node in the FDL thereabove, each node of the bottom FDL being a storage node to store data, wherein each node of each FDL of the symmetric failure domain tree is operably coupled to a same number of nodes in the FDL thereunder as any other nodes of the same FDL; and
    a controller comprising one or more processors and configured to:
    receive a data object comprising data blocks, and
    uniformly distribute the data blocks of the data object across the symmetric failure domain tree.

2. The system of claim 1, wherein failure of a node of a respective FDL results in failure all nodes operably coupled to the failed node of FDLs under the respective FDL, wherein the failure of storage nodes causes data stored thereon to be unavailable.

3. The system of claim 1, wherein uniformly distributing the data blocks of the data object across the symmetric failure domain tree comprises: for each FDL,
    if a number of the data blocks is evenly divisible by a number of nodes of a FDL, distributing an equal number of data blocks to each node within the FDL;
    if a number of the data blocks is not evenly divisible by a number of nodes of a FDL, distributing an equal number of data blocks to each node within the FDL and then distributing each data block of the remaining data blocks to a different node within the FDL until no data blocks are remaining.

4. The system of claim 1, wherein at least one of the plurality of FDLs comprises a category of devices, wherein the category of devices comprises one of racks, enclosures, controllers, and disks.

5. The system of claim 4, wherein the disks comprise solid-state disks.

6. The system of claim 1, wherein the controller is further configured to:
    determining whether a given FDL of the FDLs would result in data object unavailability if the data object were stored within the failure domain tree and a failure tolerance value of nodes of the given FDL fail.

7. Apparatus comprising:

data storage hardware defining an asymmetric failure domain tree comprising a plurality of FDLs extending from a top FDL to a bottom FDL, each FDL comprising at least one node, the top FDL comprising a single root node, each other FDL comprising at least one node operably coupled to a node in the FDL thereabove, each node of the bottom FDL being a storage node to store data, at least one node of the asymmetric failure domain tree being operably coupled to a different number of nodes in the FDL thereunder as any other nodes of the same FDL; and a controller comprising one or more processors and operably coupled to the data storage hardware, the controller configured to generate a symmetric failure domain tree using the asymmetric failure domain tree, each node of each FDL of the symmetric failure domain tree being operably coupled to the same number of nodes in the FDL thereunder as any other nodes of the same FDL.

8. The apparatus of claim 7, wherein generating a symmetric failure domain tree using the asymmetric failure domain tree comprises generating a plurality of symmetric failure domain trees using the asymmetric failure domain tree.

9. The apparatus of claim 7, wherein generating a symmetric failure domain tree using the asymmetric failure domain tree comprises:

for each FDL of the asymmetric failure domain tree:
determine a minimum number of nodes in the FDL that are operably coupled to a same node in the FDL thereabove, and
remove any nodes in the FDL exceeding the minimum number that are operably coupled to a same node in the FDL thereabove.

10. The apparatus of claim 7, wherein generating a symmetric failure domain tree using the asymmetric failure domain tree comprises:

for each FDL of the asymmetric failure domain tree starting at the bottom FDL and progressing toward the top FDL, remove any nodes in the FDL causing asymmetry.

11. The apparatus of claim 10, wherein generating a symmetric failure domain tree using the asymmetric failure domain tree comprises:

generating a symmetric failure domain trees for each of the removed nodes.

12. The apparatus of claim 7, wherein generating a symmetric failure domain tree using the asymmetric failure domain tree comprises:

generating a virtual symmetric failure domain tree using the asymmetric failure domain tree; and
generating one or more symmetric failure domain trees using the virtual symmetric failure domain tree.

13. A method comprising:

receiving a data object comprising data blocks to be stored in a failure domain tree and defining a failure recovery value, the failure recovery value being a maximum number of failed data blocks while being able to recover the data object, the failure domain tree comprising a plurality of failure domain levels (FDL) extending from a top FDL to a bottom FDL, each FDL comprising at least one node and defining a failure tolerance value (FTV), the failure tolerance value being a number of nodes permitted to fail in the FDL, the top FDL comprising a single root node, each other FDL comprising at least one node operably coupled to a node in the FDL thereabove, each node of the bottom FDL being a storage node to store data; and determining whether a given FDL of the FDLs would result in data object unavailability if the data object were stored within the failure domain tree and more than a FTV of nodes of the given FDL fail.

14. The method of claim 13, wherein determining whether the given FDL of the FDLs would result in data object unavailability if the data object were stored within the failure domain tree and more than the FTV of nodes of the given FDL fail comprises:

determining a number of unavailable data blocks that would be unavailable if the number of nodes permitted to fail in the given FDL according to the FTV fail; and
comparing the number of unavailable data blocks to the failure recovery value.

15. The method of claim 13, wherein the FTV of the bottom FDL is greater than the failure tolerance value of FDLs above the bottom FDL.

16. The method of claim 13, wherein each node of each FDL of the failure domain tree is operably coupled to a same number of nodes in the FDL thereunder as any other nodes of the same FDL, and wherein failure of a node of a respective FDL results in failure all nodes operably coupled to the failed node of FDLs under the respective FDL, wherein the failure of storage nodes causes data stored thereon to be unavailable.

17. The method of claim 13, further comprising uniformly distributing the data blocks of the data object across the failure domain tree.

18. The method of claim 17, wherein uniformly distributing the data blocks of the data object across the failure domain tree comprises: for each FDL, if a number of the data blocks is evenly divisible by a number of nodes of a FDL, distributing an equal number of data blocks to each node within the FDL; and if a number of the data blocks is not evenly divisible by a number of nodes of a FDL, distributing an equal number of data blocks to each node within the FDL and then distributing each data block of the remaining data blocks to a different node within the FDL until no data blocks are remaining.

19. The method of claim 13, wherein at least one of the plurality of FDLs comprises a category of devices, wherein the category of devices comprises one of racks, enclosures, controllers, and disks.

* * * * *